VARIABLE RESISTANCE CONTROL WITH MOUNTING MEANS THEREFOR

Filed Aug. 14, 1968

INVENTOR
EDGAR F. HAUENSTINE
BY Robert J. Meyer
ATTORNEY

United States Patent Office 3,519,974
Patented July 7, 1970

3,519,974

VARIABLE RESISTANCE CONTROL WITH MOUNTING MEANS THEREFOR

Edgar F. Hauenstine, Frankfort, Ind., assignor to P. R. Mallory & Co., Inc., Indianapolis, Ind., a corporation of Delaware Filed Aug. 14, 1968, Ser. No. 752,613
Int. Cl. H01c *1/02*
U.S. Cl. 338—197 6 Claims

ABSTRACT OF THE DISCLOSURE

In a control unit, at least one variable resistor means is carried in or by a cup-shaped cover, the cup-shaped cover having means formed in opposed ends thereof for receiving resilient mounting means. A control base closes the open end of the cup-shaped cover thereby forming a housing for the control unit. The control base traps the mounting means in the cover. The mounting means provides a plug-in or snap-in mounting for the control unit on a circuit board.

Variable resistors such as used in television and radio receivers are usually carried by or mounted in a suitable housing or container so as to be combined as a single unit so that they may be readily mounted in such television or radio receiver on a suitable member. The mounting means used to mount the container or box in the receiver must, of necessity, be simple in construction such that it may be easily mass produced. In addition, the mounting means must be such that the variable resistor can be quickly, easily and accurately positioned with respect to the other components retained by the receiver. Also the mounting means should have the characteristic of securely retaining the resistor (control unit) on the mounting member thereby preventing rattling and harmful vibration which may subject the operating parts to harmful stresses and strains.

The present invention is concerned with a variable resistance control unit having mounting means for providing a snap-in or plug-in mounting for the unit onto a suitable support means, and thas as one of its objects the provision of such mounting means that is economical, simple and easy to mass produce.

Another object of the invention is to provide a variable resistance control unit having at least one variable resistor positioned in a housing, the unit having mounting means which will assure that the resistors are in the correct posititon in relation to the components controlled by the unit after the unit has been mounted on a support member.

Another object of the invention is to provide a variable resistance control unit having at least one variable resistor positioned in a housing, the unit having mounting means which will assure that the resistors are in the correct position when the unit is mounted on a circuit board.

Another object of the invention is to provide a variable resistance control unit having mounting means which is separately attachable to the housing carrying the unit.

A further object of the invention is to provide a variable resistance control unit having mounting means which is separately attachable to the housing carrying the unit such that different forms of the mounting means may be used with the same unit.

Still another object of the invention is the provision of a variable resistance control unit wherein variable resistance units are carried in a cup-shaped cover having a control base to close the same.

Yet another object of the invention is the provision of a variable resistance control unit wherein variable resistors are carried by a cup-shaped cover with a control base to close the same and wherein the control base traps the mounting means for the unit in the proper place.

Another object of the invention is the provision of a variable resistance control unit wherein variable resistors are carried in or by a housing and wherein the mounting means for mounting the housing onto a support member comprises a body member having flanges extending therefrom, and means engaging the support member, the body member and the flanges engaging means disposed at each end of the housing for receiving the mounting means.

Still another object of the invention is the provision of a variable resistance control unit wherein its mounting means includes a body member and flanges extending from the body member, the body member and the flanges engaging a tongue formed in opposite ends of the housing carrying the variable resistors of the unit.

Another object of the invention is the provision of a variable resistance control unit wherein the means engaging the support member are ears extending from the body member, the ears having fastening means engaging the support member.

These and other objects of the invention and the nature thereof will become apparent from the following description considered in conjunction with the accompanying drawings and wherein like reference numbers describe elements of a similar function.

For illustrative purposes, the invention will be described in conjunction with the accompanying drawings in which.

Figures 1, 2, 3, 4:
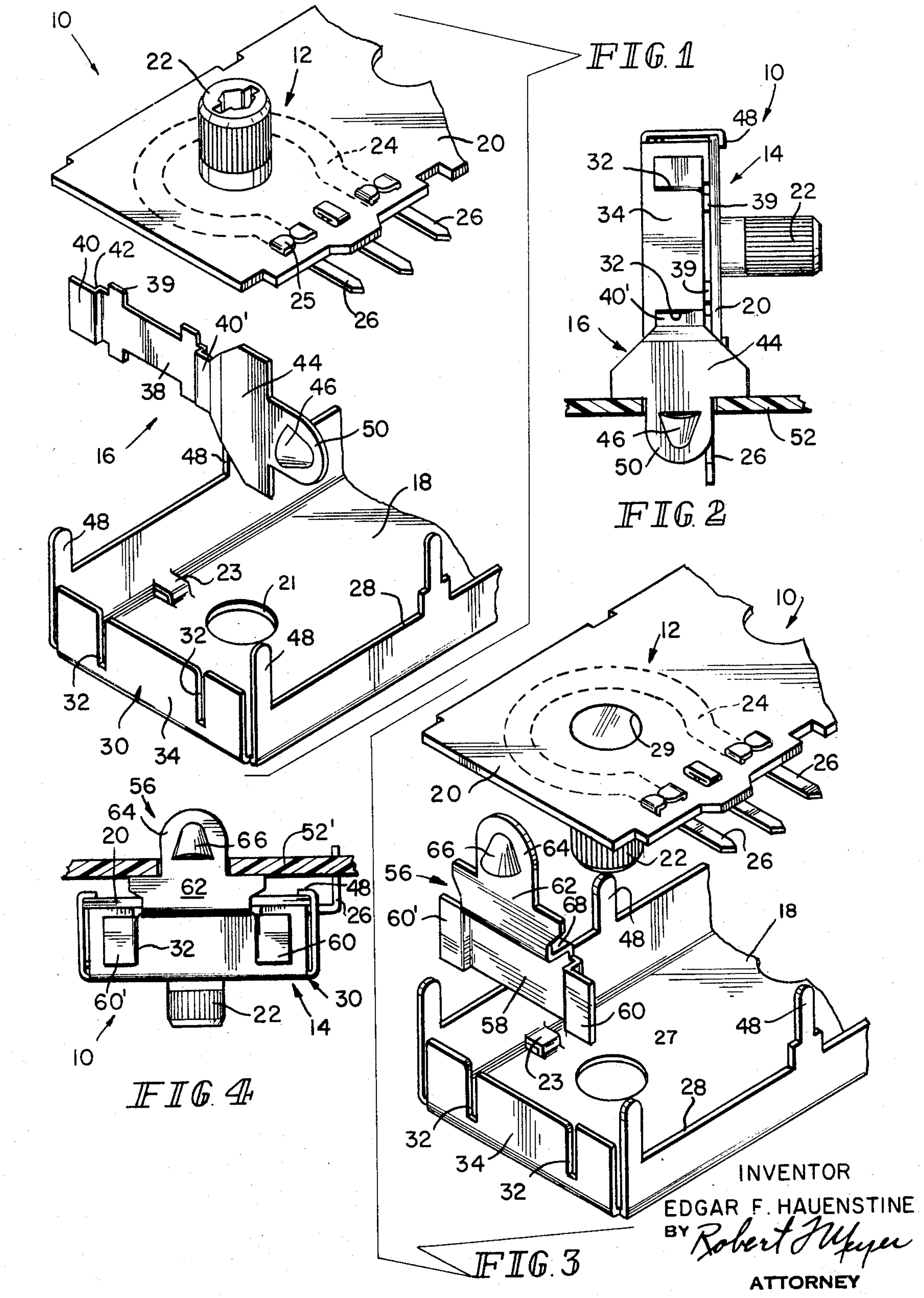
FIG. 1 is an exploded view showing the relationship of the mounting means to the cup-shaped cover and the control base for the variable resistor unit.
FIG. 2 is a side view of the complete unit mounted on a circuit board.
FIG. 3 is a view similar to FIG. 1 showing another embodiment of the mounting means.
FIG. 4 is a side view of the complete unit mounted on a circuit board using the mounting means of FIG. 3.

Generally speaking, there is provided a variable resistance control unit wherein at least one variable resistor is disposed in a cup-shaped cover having a control base to close the same. There is included a plug-in or snap-in mounting means for mounting the cup-shaped cover onto a support member, the mounting means engaging means disposed at opposite ends of the cup-shaped cover for receiving the mounting means and means for retaining the control base in place with respect to the cup-shaped cover such that the control base traps the mounting means in the cover through the means for receiving the mounting means.

Referring now to FIGS. 1 and 2, there is shown a variable resistance control unit 10 having in general at least one variable resistor unit 12, the variable resistor being at least partially enclosed in a housing 14. Housing 14 includes a substantially rectangular cup-shaped cover 18 and a control base which includes a plate 20 for closing the open end thereof. The cup-shaped cover is usually constructed of a metal such as steel, while the control base is usually constructed of an insulative material such as a laminated phenolic.

The resistor unit 12, in general includes a shaft 22, a resistive path 24 and wiper nibs (not shown) which are displaced by rotation of the shaft so as to ride over resistive path 24 to thereby vary the resistance of the unit. Resistive path 24 is retained by control base 20 through suitable means such as tangs 25 which are bent over so as to lock the resistive path to the plate. Alternately, where control base 20 is formed of a metal, the resistive path could be held to the base through an intermediate insulative layer. As shown, the variable resistance unit has a shaft 22 extending through an aperture formed in the control base, and as previously noted, the shaft carries wiper nibs which ride on resistive path or element 24. The shaft has a relatively close fit in the aperture formed in the control base and is journalled in bearing means 21. Electrical terminals 26 are electrically connected to resistive element 24 in any suitable manner and extend through corresponding notch 28 formed in the cup-shaped cover. At least one stop means 23 is provided to limit the rotational displacement of shaft 22. It should be understood that several of the control units 12 can be retained in cup-shaped cover 18.

Included as part of the variable resistance unit is a mounting means 16 adapted to engage a means 30 formed in cup-shaped cover 18 to receive mounting means 16. As only a portion of the cup-shaped cover 18 is shown, it should be understood that there may be oppositely disposed similar mounting means and means to receive the mounting means on the other end of the member. As shown, means 30 includes slots 32 formed in the cup-shaped cover 18 which cooperate to form tongue 34. Mounting means 16 including resilient legs having a body member 38 from which there are extended oppositely disposed flanges 40 and 40'. Each of the flanges form a shoulder 42 such that the resilient legs can be inter-fitted between the slots 32 and the tongue 34. Extending from at least one of the flanges 40' is an ear portion 44 having a fastening means which includes a barb 46 lanced from the ear. Barb 46 may be of various shapes depending upon the means to which the mounting means may be engaged.

To assemble the unit, mounting means 16 is seated in slots 32 through shoulders 42 and then control base 20 with the resistor unit 12 is placed over cup-shaped cover 18. Control base 20 will extend over the tabs 39 extended from body member 38 to hold the mounting means 16 in place. Tabs 39 serve as positioning means for control base 20 in its relationship to cup-shaped cover 18 with their height being varied according to the desired position of the control base. Control base 20 is secured to cup-shaped cover 18 by bending ears 48 over the control base. The control base thus traps the mounting means 16 in the means 30 receiving the mounting means. The complete assembled unit is shown in FIG. 2. The assembled unit is fastened onto a suitable support member, which as shown, includes a circuit board 52, the lobe 50 of ear 44 being plugged in or snapped in a suitable aperture formed in the circuit board. Such board will also have apertures through which terminals 26 may be extended. The resilient legs will bend or flex at a point intermediate the free end of the ear 44 and the end joining the ear to the flange 40' so that the legs can be easily inserted into the apertures of the circuit board. The apertures in the circuit board are disposed such that the legs flex inwardly to thus cause body member 38 to abut against the inner surface of tongue 30 so as to additionally aid in holding the mounting means in place. The spring tension of the barb 46 retains the mounting means 16 and thus the whole control unit in place on circuit board 52. The combination of the variable resistor 12 being carried by the control base 20 with the base trapping the mounting means 16 in place, provides a simple means for assuring that the resistor 12 will be mounted in proper relationship within the cup-shaped cover.

Referring now to FIG. 3, there is shown another embodiment of the mounting means 16 of FIG. 1. Mounting means 56 in this embodiment includes a resilient leg having a body member 58 with oppositely extending flanges 60 and 60'. Extending from the body portion is an ear 62 having a lobe portion 64 in which a barb 66 is lanced to form a fastening means for the ear. In this embodiment when the mounting means 56 is engaged in receiving means 30 of the cup-shaped cover 18, control base 20 will extend over the shoulder 68 formed as part of the extension of the ear 62. Thus when the control base 20 is locked into place by ears 48 in the manner described with reference to FIG. 1, the mounting means 56 will be trapped in the receiving means 30. As shown in the embodiment, the shaft 22 extends through an aperture 27 formed in cup-shaped cover 18, with the shaft being journalled in bearing means 29. The assembled unit is shown in FIG. 4. The assembled unit can be fastened to a circuit board 52' in the manner of FIG. 2 there being suitably formed apertures in the circuit board to receive shaft 22 of the variable resistor 12, and the terminals 26.

Thus there is described a variable resistance control unit including a mounting means for quickly and easily mounting the control unit on to a supporting member such as a circuit board. The concept of using mounting means separately inserted into holding means associated with the unit assures that the individual variable resistance controls will be accurately mounted on a circuit board. In addition the use of a mounting means which is inserted into means formed in the housing for receiving the mounting means enables the mounting means to be made of less material than if the counting means were formed from the housing. Thus a cost saving in material is realized. These features as well as others are set forth in the appended claims.

What is claimed is:

1. A variable resistor unit comprising:

(a) an open cup-shaped cover,
(b) a base member closing same,
(c) at least one variable resistor means carried by said base member and extending into said cover,
(d) slots cut from opposed ends of said cup-shaped cover forming a tongue in said opposed end,
(e) a resilient mounting means inter-fitted between said slots and said tongue, said mounting means including a body member, an ear extending from said body member, and positioning means extending from said body member, said positioning means engaging said base member so as to position said base member with respect to said cover, and
(f) means securing said base member to said cover.

2. A variable resistor unit according to claim 1 wherein said positioning means includes a pair of tabs extending from said body member.

3. A variable resistor unit according to claim 1 wherein said positioning means includes a shoulder connecting said resilient leg to said body member.

4. A variable resistor unit according to claim 1 wherein said mounting means includes fastening means carried by said ear.

5. A variable resistor unit according to claim 4 wherein said fastening means are barbs lanced from said ear.

6. A variable resistor unit according to claim1 wherein said means securing said base member to said cover includes a plurality of ears extending from said cover.

References Cited

UNITED STATES PATENTS

| | | | |
|---|---|---|---|
| 2,627,385 | 2/1953 | Tinnerman. | |
| 3,298,641 | 1/1967 | Puerner | 338—197 XR |
| 3,366,911 | 1/1968 | Wilson et al. | 338—197 |

THOMAS J. KOZMA, Primary Examiner

U.S. Cl. X.R.

338—315